United States Patent
Surbayrole et al.

(10) Patent No.: US 12,363,645 B2
(45) Date of Patent: Jul. 15, 2025

(54) DETECTION OF COMMUNICATING OBJECTS FOR PROXIMITY INTERACTIONS

(71) Applicant: Orange, Issy-les-Moulineaux (FR)

(72) Inventors: Philippe Surbayrole, Chatillon (FR); Apostolos Kountouris, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 391 days.

(21) Appl. No.: 17/853,645

(22) Filed: Jun. 29, 2022

(65) Prior Publication Data

US 2023/0007596 A1 Jan. 5, 2023

(30) Foreign Application Priority Data

Jun. 30, 2021 (FR) .................................... 2107047

(51) Int. Cl.
*H04W 52/24* (2009.01)
*H04W 52/28* (2009.01)
*H04W 52/36* (2009.01)

(52) U.S. Cl.
CPC ....... *H04W 52/245* (2013.01); *H04W 52/283* (2013.01); *H04W 52/367* (2013.01)

(58) Field of Classification Search
CPC ............. H04W 52/245; H04W 52/283; H04W 52/367; H04W 52/228; H04W 52/246; H04W 4/023; H04W 4/80
See application file for complete search history.

(56) References Cited

U.S. PATENT DOCUMENTS

2021/0176759 A1 6/2021 Abedini et al.
2022/0232483 A1* 7/2022 Tanaka .................. H04W 52/24

FOREIGN PATENT DOCUMENTS

| EP | 3 499 643 A1 | 6/2019 |
| EP | 3 567 739 A1 | 11/2019 |
| EP | 3 860 230 A1 | 8/2021 |
| WO | WO 2015/119655 A1 | 8/2015 |

OTHER PUBLICATIONS

French Search Report for French Application No. 2107047, dated Feb. 15, 2022.
Written Opinion for French Application No. 2107047, Feb. 25, 2022.
European Extended Search Report for European Patent Application No. 22181040, dated Oct. 21, 2022 by European Patent Office.

* cited by examiner

*Primary Examiner* — Ankur Jain
(74) *Attorney, Agent, or Firm* — Knobbe, Martens, Olson & Bear, LLP

(57) ABSTRACT

A method, implemented by a first device, for establishing a radiofrequency communication with at least a second device is disclosed. The method includes a) transmission of a first message at a first transmission power, b) reception of at least one second message coming from at least the second device, the second message including data relating to a second transmission power of the second device, c) transmission of a third message at a third transmission power towards the second device, the third transmission power being determined on the basis of the second transmission power.

15 Claims, 4 Drawing Sheets

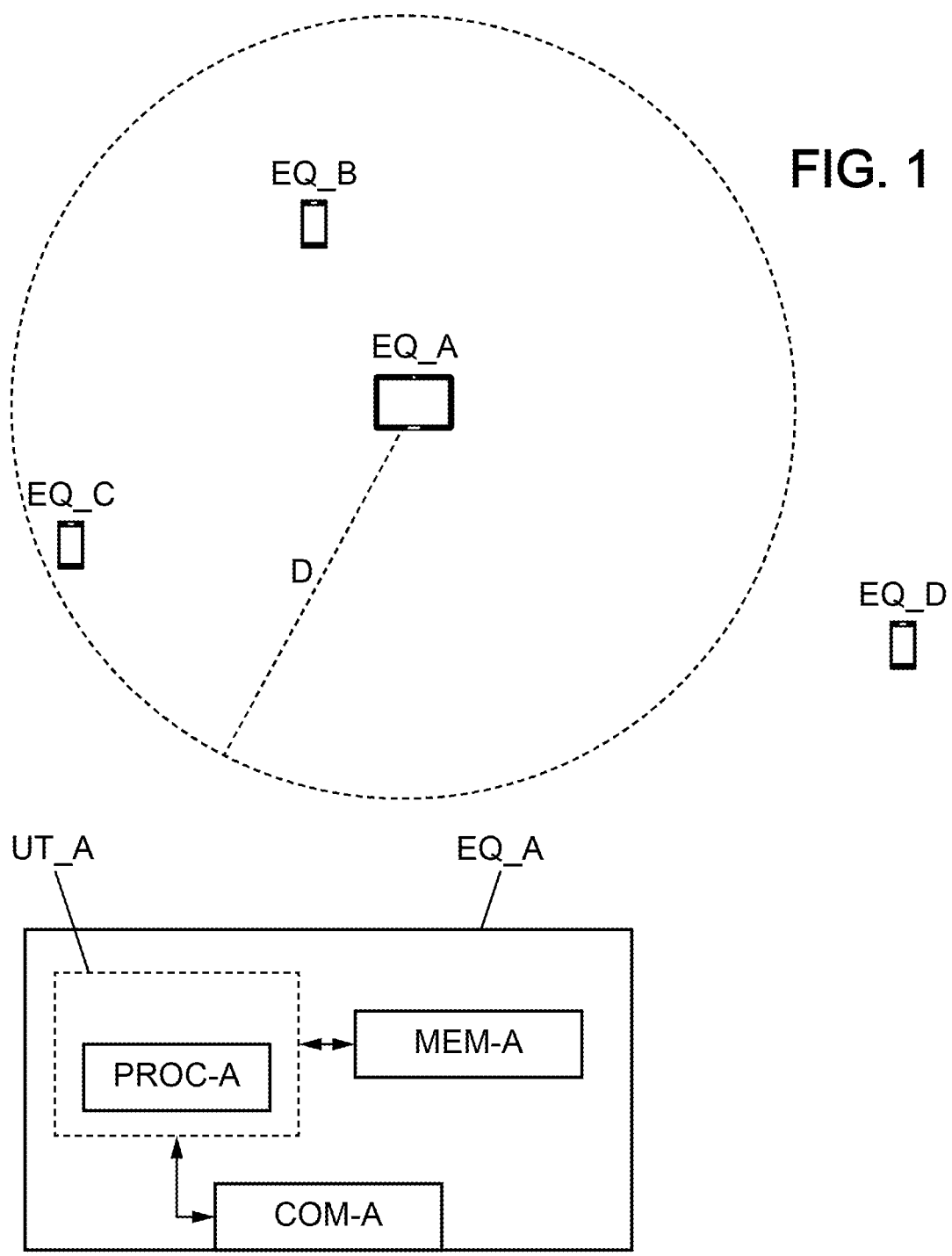

DETECTION OF COMMUNICATING OBJECTS FOR PROXIMITY INTERACTIONS

CROSS-REFERENCE TO RELATED APPLICATIONS

This application claims foreign priority to French Patent Application No. FR 2107047, entitled "DETECTION OF COMMUNICATING OBJECTS FOR PROXIMITY INTERACTIONS" and filed Jun. 30, 2021, the content of which is incorporated by reference herein in its entirety.

BACKGROUND

Field

This disclosure relates to the field of radiofrequency communications between communicating objects, and more particularly to the detection of communicating objects in a context of proximity interactions.

Description of the Related Technology

Many applications rely on detection protocols between multiple devices, peripherals, or communicating objects. For example, in the commercial sector, applications for contactless payment or for sending a receipt in digital form to a customer's mobile terminal after checkout consist of an interaction between at least two devices communicating via wireless communication. In a context of pandemic management, mobile applications may consist of maintaining a minimum safe distance between individuals, for example by sending alert messages to the mobile terminals of individuals detected as being closer than the minimum safe distance. In particular, such applications are often characterized by a need to detect physical proximity between devices. Such detection of physical proximity may correspond to a (maximum or minimum) tolerated distance between devices that is centimetric in scale, as is the case for near field communication (NFC), or is several meters in the case of communication via Bluetooth for example.

Many communication protocols then require estimating a distance between two communicating devices, so as to establish a selective interaction with a specific device or group of devices. For example, the sending of a payment receipt by a tollbooth terminal (or by an automatic pay station) aims to send the receipt only to the driver (or customer) located next to the terminal in the toll queue (or checkout) concerned and not to a driver (or customer) located in a different lane. Another example may consist of debiting the amount of a travel ticket when a passenger boards a bus at a stop and crosses a specific zone containing a payment terminal (at the front of the bus for example): such a payment application then aims to detect and debit funds from passengers boarding the bus and not from a pedestrian walking on the pavement near the bus stop. Such interaction applications thus require the detection by a first communicating device (for example a payment terminal) of at least a second communicating device (for example a mobile terminal of a passenger or a customer) within a geographical area of proximity delimited by a predefined distance.

However, proximity detection and distance estimation between communicating objects are often imprecise in existing communication protocols. Indeed, such protocols may for example consist of a receiving object (such as a mobile terminal) receiving radiofrequency signals at powers received from transmitting objects (such as beacons). On the basis of such signal powers received (using the intensity of the received signal or RSSI for "Received Signal Strength Indication"), the receiving object then estimates the respective distances from each transmitting object. Such a distance estimate may be biased by the attenuation of radiofrequency signals during their propagation. The powers received by the receiving object then do not reflect the actual distances from the transmitting objects. In addition, such a distance estimate based on the power received often relies on an assumption of line-of-sight (LoS) propagation of the signals, which is not always valid. The orientation and position of the transmitting and receiving communicating objects relative to each other or the presence of physical obstacles (such as a wall or the metal body of a vehicle, for example) between the transmitting and receiving communicating objects may reflect the radio waves and distort the estimation of distance by the receiving object.

SUMMARY OF DISCLOSURE

This disclosure thus improves the situation.

A method is proposed, implemented by a first device, for establishing a radiofrequency communication with at least a second device, at a minimum target transmission power which is a function of a distance between the first device and the second device, the method comprising:
  a) transmission of a first message at a first transmission power, said first transmission power being greater than the minimum target transmission power,
  b) reception of at least one second message coming from at least the second device, said second message being received at a second reception power and comprising data relating to a second transmission power of the second device,
  c) transmission of a third message at a third transmission power towards the second device, said third transmission power being determined on the basis of the second reception power and the second transmission power.

Consequently, the method allows a device, in particular a connected communicating object, to initiate a proximity interaction by detecting other devices within a predefined area and appropriate for the interaction implemented. Indeed, many interaction applications between devices are based on geographical criteria, such as a minimum and/or maximum distance required between the devices concerned. Such applications, known as proximity applications, may for example include contactless payment operations, the sending of information targeting a set of individuals limited to a specific geographical perimeter, or enabling selective access to individuals detected at specific distances.

The transmission of the first message at a first transmission power greater than the minimum target transmission power thus makes it possible to define a targeting of the devices that the first device wishes to detect. The first device thus ensures that the devices receiving the first message will be within the perimeter defined by the range of the first message.

In addition, the method allows mutual detection of devices and is based on a collaborative process during which the devices exchange, use, and verify their communication information. This makes it possible in particular for the detected devices to confirm the estimates made by the first device. The method makes it possible in particular to compare the communication information in the stage of transmission by a device and in the stage of reception by another device, so as to characterize the propagation conditions between the two devices, in terms of distance or line-of-sight propagation for example. The method makes it possible, for example, to avoid a single, unilateral, and imprecise estimation of a distance separating the first device, transmitter of a signal, and the second device, receiver of the signal.

The first device designates a communicating object, preferably connected, capable of exchanging information and data in the form of messages with at least one second device that is different from the first device. The first device is therefore capable of transmitting and/or receiving messages in the form of radiofrequency waves (or signals). The first device may communicate via communication antennas integrated into the structure of the device for example. The first device and second device may have autonomous structures, such that each of the first and second devices is able to transmit signals at given transmission powers and/or to receive signals at measured reception powers.

The transmission of a first message allows the first device to initiate detection of any other devices present within an area of proximity defined by the range of the first message and therefore by the first transmission power. Such a range depends in particular on the propagation conditions of the first message and in particular on the possible presence of physical obstacles.

The reception of a second message allows the first device to detect the presence of other devices (in this case, the second device) present within the area of proximity defined by the range of the first message. Such devices are therefore candidate devices for the implementation of an interaction by the first device, in the context of a proximity application for example. In particular, the reception of data relating to the second transmission power of the second message allows the first device to quantify the propagation conditions of the second message between the second device and the first device, in particular by a ratio between the second transmission power by the second device and a second reception power by the first device for example. The quantification of such propagation conditions of the second message is thus based on information specific both to the first device (such as the second reception power measured during the reception of the second message) and to the second device (such as the second transmission power chosen by the second device).

The transmission of a third message therefore allows the first device, after detection of a second candidate device for the implementation of an interaction by the first device, to confirm proximity between the first device and the second device. Such proximity confirmation may for example consist of verifying the correlation between the third transmission power of the third message and a power at which the third message will be received by the second device. Such proximity confirmation may be based on a first assumption of correlation, determined by the first device, between the second transmission power and the second reception power of the second message. The third message can thus allow confirming such a first correlation assumption. Such a first correlation assumption may for example be an assumption of line of sight between the first device and the second device, which would imply for example a proportionality between the first device's reception power of a message coming from the second device and the square of the distance separating the first and second devices.

Optionally, in another possible embodiment of the method, a method is proposed, implemented by a first device, for establishing radiofrequency communication with at least one second device, at a minimum target transmission power which is a function of a distance between the first device and the second device, the method comprising:

a) transmission of a first message at a first transmission power, said first transmission power being greater than the minimum target transmission power, b) reception of at least one second message coming from at least the second device, said second message being received at a second reception power and comprising data relating to the second transmission power of the second device, c) transmission of a third message at a third transmission power towards the second device, said third transmission power being determined on the basis of the second reception power and the second transmission power.

In one embodiment, the method further comprises:

a first estimate of the distance between the first device and second device, made on the basis of a second reception power of the second message and the second transmission power, and wherein the third transmission power is further determined on the basis of the first distance estimate.

Consequently, the first device is able to quantify the proximity between the first device and the second device by a first distance estimate. Such a quantification may be implemented using data received from the second device (such as the second transmission power) and data determined by the first device (such as the second reception power). Moreover, such a first distance estimate may be based on a first assumption of correlation between the second reception power and the second transmission power, for example linked to the presence of line of sight between the first and the second device, meaning the absence of any physical obstacle deviating and/or reflecting the radio waves constituting the messages transmitted between the first and second device. The transmission of such a third message then makes it possible to confirm such a proximity quantification by the first device on the one hand, and to confirm such a first correlation assumption on the other hand.

In one embodiment, the third message comprises at least the first distance estimate.

Consequently, the second device will receive such a first distance estimate implemented by the first device and may possibly compare such a first estimate with a possible estimate of such a distance implemented at the second device.

In one embodiment, the third message comprises at least one data item relating to the third transmission power.

Consequently, the second device will know the power at which the third message received by the second device was transmitted by the first device. As it is also able to measure a third reception power upon reception of the third message, the second device will be able to formulate a second assumption of correlation between the reception conditions (in particular the third reception power measured) and the transmission conditions (in particular the third transmission power received) of the third message, much as the first device can for the reception conditions and transmission conditions of the second message.

In one embodiment, the radiofrequency communication is established for the purpose of a proximity application, said proximity application being characterized by at least one proximity criterion between the first device and the second device, and the third message is transmitted at least on the basis of said first proximity criterion, a second reception power of the second message, and the second transmission power.

Consequently, the transmission of the third message by the first device may be dependent on a required proximity criterion in the context of a proximity application initiated by the first device and for which the second device is a potential candidate. The third message may thus contain different information depending on whether or not such a first proximity criterion is satisfied.

In one embodiment, said proximity criterion corresponds to a tolerated distance between the first device and the second device, and the third message is transmitted on the basis of a comparison between the first distance estimate and the tolerated distance.

Consequently, the transmission of the third message may be dependent on a comparison between the first distance estimate and a tolerated distance within the context of the proximity application initiated by the first device. The tolerated distance may be a maximum tolerated distance, for example in the context of a proximity application for contactless payment (the first device corresponding for example to a payment terminal). In this case, the content and the role of the third message in the detection method may depend on the comparison between the first distance estimate and the tolerated distance. If the first distance estimate is strictly greater than the tolerated distance, this may mean either that the first distance estimate is incorrect, or that the distance between the first device and the second device does not satisfy the proximity criterion of the proximity application being implemented. The third message may then be a new detection message from the first device, for example. If the first distance estimate is less than the tolerated distance, proximity detection with the second device can be continued, for example by confirming a quantification of the proximity as estimated by the first device. The tolerated distance may also be a minimum tolerated distance, for example in the context of a proximity application for maintaining a safe distance between individuals.

In one embodiment, the method further comprises:
d) reception of a fourth message coming from the second device, said fourth message being received at a fourth reception power, the fourth message comprising at least one data item relating to a second distance estimate between the first device and the second device.

Consequently, the first device may receive a response from the second device after the third message confirming the proximity quantification and/or the first correlation assumption. In particular, the first device is then able to compare its first distance estimate with the second distance estimate made by the second device. Such a fourth message may then allow the first device to confirm the validity of its estimate. Such a fourth message may also allow confirming the first correlation assumption indicating a direct view between the first and second device. This then allows an optimized implementation of the proximity application by guaranteeing an accurate estimation of the proximity between the devices concerned.

Conversely, the reception of such a fourth message may also make it possible to invalidate the estimations of the first device concerning proximity to the second device, for example in the case where the data relating to the second distance estimate by the second device differ significantly from those of the first device. Such a fourth message then allows the first device to guide the detection method so as to refine its quantification of the proximity to the second device, and to better identify the propagation conditions between the first device and second device before implementation of the proximity application.

In one embodiment, the data relating to the second distance estimate comprises an element or a combination of elements among:
a value of the second distance estimate,
a difference between the first distance estimate and the second distance estimate, and
an indication relating to the validity of the first distance estimate.

Consequently, the reception of such data allows the first device to determine whether its estimation of proximity to the second device is confirmed or invalidated by the estimates of the second device.

In one embodiment, the fourth message further comprises data relating to a fourth transmission power of the second device.

Consequently, the first device is then able to implement new estimations of the proximity between the first device and second device, in view of the measured reception conditions and the transmission conditions obtained from the fourth message. The first device is also capable of verifying the estimates made by the second device.

In one embodiment, steps c) and d) are repeated by replacing the second reception power with the fourth reception power and the second transmission power with the fourth transmission power, if the difference between the first distance estimate and the second distance estimate is greater than a predefined threshold.

Consequently, if the quantifications of proximity—and more particularly of distances—(respectively estimated on the second and third messages) diverge between the first and second devices, the method of proximity detection can be reiterated with the transmission and reception conditions of the subsequent messages. The method can thus be reiterated by a message requiring confirmation of a proximity estimate by the first device and a return message from the second device confirming or not confirming such an estimate. A stop condition for such iterations may consist of a maximum number of repetitions after which the implementation of the proximity application with the second device can be abandoned. Another stop condition may consist of repeating the method until the respective proximity estimates of the first and second devices converge to within a predefined error threshold.

In one embodiment, the second transmission power of the second device is lower than the first transmission power of the first device.

Consequently, when sending the second message, the second device can already perform a quantification (implicit here) of the proximity between the first device and second device. Indeed, if the second device considers that the reception power of the first message actually measured by the second device is much higher than the reception power necessary to receive the first message, the second device can transmit the second message at a different power lower than the first transmission power. The second transmission power remains selected so that the second message reaches the position of the first device.

In one embodiment, the first message further comprises an element or a combination of elements among:
an identifier of the first device,
data relating to an implementation of a proximity application by the first device.

Consequently, the first message makes it possible to indicate a potential intention of the first device to establish an interaction with the device receiving such a first message. The content of such a first message is particularly useful in the event that the first message may be a widely distributed message (of the broadcast type for example) not targeting any device in particular. The content of the first message then allows devices unable to interact with the first device, in the context of such a proximity application, not to respond to the first message (by not sending a second message for example).

In one embodiment, the second message further comprises an element or a combination of elements among:
- data relating to the conditions of reception of the first message by the second device,
- an identifier of the second device,
- data relating to an implementation of a proximity application by the second device.

Consequently, the content of the second message allows the first device to identify the devices having received the first message and therefore the candidate devices for interaction with the first device in the context of the proximity application. Such content of the second message in particular allows the first device to adapt the content of the third message, such a third message in principle being transmitted in a dedicated manner to the second device.

According to a second aspect, a first device is proposed comprising at least: a memory unit; a processing unit comprising at least one processor, the first device being suitable for implementing the method.

According to a third aspect, a computer program is proposed comprising instructions for implementing the method when this program is executed by a processor.

BRIEF DESCRIPTION OF THE DRAWINGS

Other features, details, and advantages will become apparent upon reading the detailed description below, and upon analyzing the appended drawings, in which:

FIG. 1 shows respective positions of four devices according to one embodiment.

FIG. 2 shows a structure of a device according to one embodiment.

DETAILED DESCRIPTION OF THE EMBODIMENTS

Figure 3:
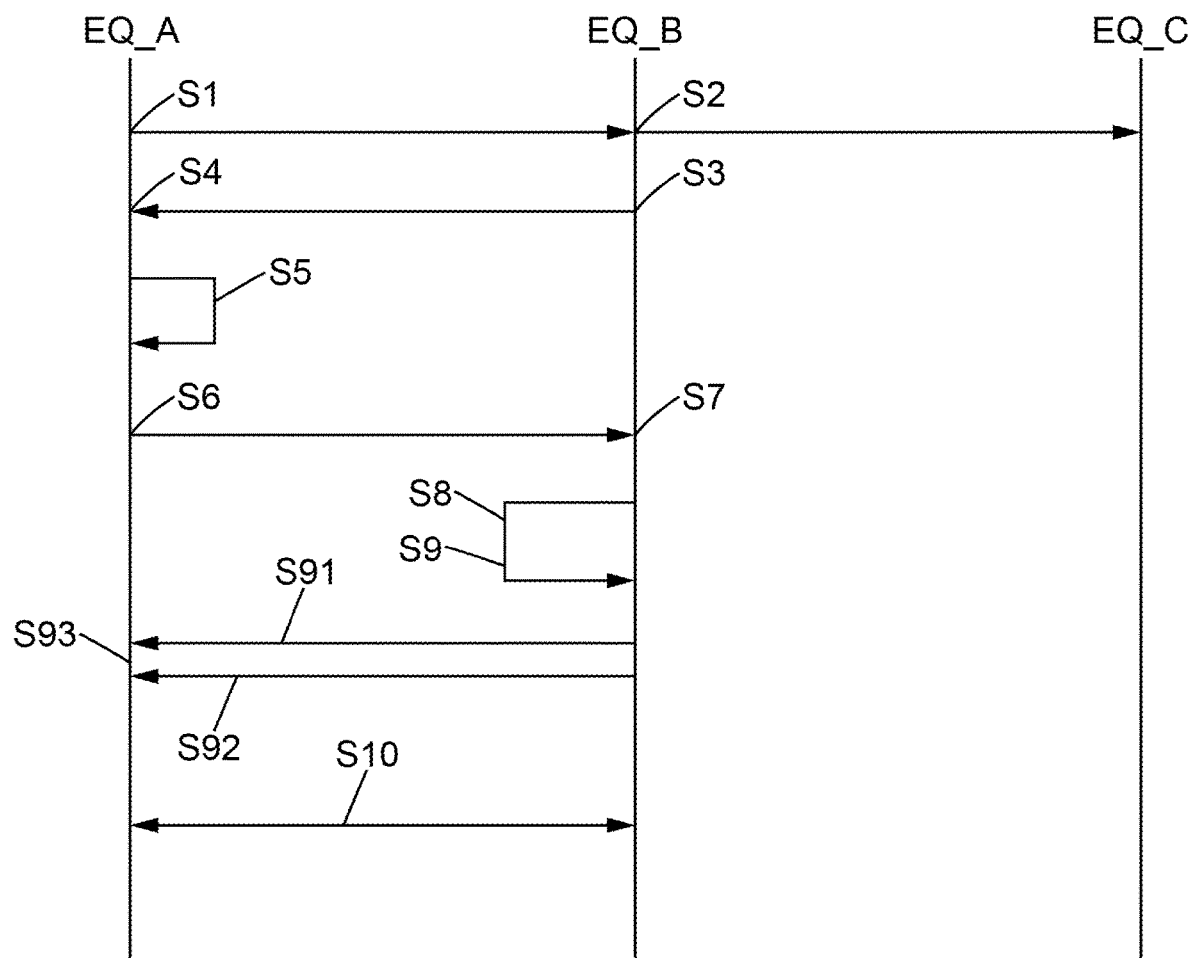
FIG. 3 shows a method for detecting devices according to one embodiment.

Reference is made to FIGS. 1 and 2. FIG. 1 represents a system composed of several devices EQ_A, EQ_B, EQ_C, and EQ_D (or EQ_A-EQ_D). Each device EQ_A-EQ_D is a communicating object capable of transmitting, receiving, and more generally exchanging information and data with other objects of the communicating object type, servers, and/or with users. The devices EQ_A-EQ_D may or may not be connected communicating objects. In the case of connected communicating objects, the devices EQ_A-EQ_D may be connected to a communication network not represented in FIG. 1, such as the Internet for example. The devices EQ_A-EQ_D are objects having autonomous communication, such that they can communicate with other objects without human intervention. Furthermore, the devices EQ_A-EQ_D are also energy-autonomous. For this purpose, the devices may comprise an integrated energy source such as a battery (not shown in FIGS. 1 and 2).

On the one hand, each device EQ_A-EQ_D is capable of emitting (or transmitting) signals (or messages) in the form of radiofrequency waves. Such messages may correspond to broadcast, multicast, and/or unicast type transmissions for example. On the other hand, each device EQ_A-EQ_D is able to receive messages sent by other objects. For these purposes and as illustrated in FIG. 2, each device EQ_A-EQ_D comprises a communication unit COM-A (respectively COM-B, COM-C, COM-D for devices EQ_B-EQ_D). Such a communication unit COM-A may comprise a radiofrequency reception antenna. Such a communication unit COM-A may also comprise a radiofrequency transmission antenna. For each device, each radiofrequency antenna has a gain (or amplification power, expressed in decibels relative to isotropic or dBi for example) for the signals processed by the antenna. The communication unit COM-A may also comprise a human-machine interface.

Also, each device EQ_A-EQ_D is able to process the content of such transmitted and received messages. To this end and as illustrated in FIG. 2, each device EQ_A-EQ_D comprises a processing unit UT_A (respectively UT_B, UT_C, UT_D for devices EQ_B-EQ_D), consisting of at least one processor PROC-A (respectively PROC-B, PROC-C, PROC-D for devices EQ_B-EQ_D). Such a processing unit UT_A has one or more computing units (not represented in FIG. 2). For example, a computing unit of each device EQ_A-EQ_D is capable of converting the radiofrequency signals (for example in analog form) into a set of digital values comprising for example the power of the signal. For example, a computing unit of each device EQ_A-EQ_D is able to implement distance calculations based on known power values (measured or received). The processing unit UT_A is also capable of implementing the proximity application, for example by sending data specific to the proximity application (such as a payment receipt or an alert) via the communication unit COM-A. More generally, the processing unit UT_A of each device EQ_A-EQ_D is capable of executing algorithmic protocols and/or instructions stored in the form of software or any other type of non-transitory computer media.

Finally, each device EQ_A-EQ_D is capable of storing the content of the messages transmitted and/or received. For this purpose and as illustrated in FIG. 2, each device EQ_A-EQ_D comprises a memory unit MEM-A. Such a memory unit MEM-A may comprise random access memory. The memory unit MEM-A is capable of storing predetermined values and/or preconfigured data. The memory unit MEM-A may for example store values of the target transmission power P or of the tolerated distance D for a given proximity application. The memory unit MEM-A may also store values of transmission power, reception power, and/or estimated distance values received or determined by the device EQ_A-EQ_D.

Such devices EQ_A-EQ_D can correspond to all types of fixed or mobile devices such as, for example, smartphones, tablets, connected watches, connected speakers, etc. The devices EQ_A-EQ_D, as represented in FIG. 1, each have a geographical position in space. Such a geographical position may be fixed over time, in the case of a connected speaker placed in a room for example, or variable over time, in the case of mobile devices attached to moving users (such as their mobile phones) for example. In the context of this description, it is considered that each device EQ_A-EQ_D can have a geographical position that is fixed in space, at least for a given period of time. Such a period of time may be on the order of a few seconds or a few minutes for example.

A distance may be defined for each pair of devices EQ_A-EQ_D, such a distance being fixed or variable depending on the fixed or variable geographical positions of the devices EQ_A-EQ_D.

In the rest of the description, the terms "device", "communicating device", "object", or "communicating object" will be used interchangeably.

Referring to FIG. 1, a first device EQ_A is considered. Such a first device EQ_A may correspond for example to a payment terminal having a fixed position in a toll area or even an interactive tablet fixed next to a work of art in a museum. In another example, the first device EQ_A may correspond to a mobile terminal of an individual moving about in an enclosed building (such as a supermarket for example). A proximity application (or proximity interaction) involving the first device EQ_A is also considered. For example, the proximity application may consist of sending a payment receipt to a mobile device of a driver passing by the payment terminal. The proximity application may consist of sending a presentation of a work of art to the mobile terminals of visitors close to the work of art. In another example, the proximity application may consist, for the mobile terminal of an individual, of notifying the individual (for example by an alert message transmitted via a human-machine interface of the mobile terminal) when another mobile terminal (and therefore another individual) is located at a distance of less than one meter from the individual in the context of respecting a safe distance when managing a health crisis.

More generally, the proximity application consists, for the first device EQ_A, of detecting any other devices located within a predetermined vicinity. Such a vicinity may be characterized by a target transmission power P. Such a target transmission power P then makes it possible to define a range characterizing the proximity application. In other words, the target transmission power P defines an area of proximity around the first device EQ_A in which the proximity application is executed. The target transmission power P may in particular be linked to a tolerated distance D between the first device EQ_A and another device with which the first device EQ_A can interact via the proximity application. Such a tolerated distance D is for example represented in FIG. 1, and defines the vicinity of the first device EQ_A, in the context of the proximity application, as a circle centered on the position of the first device EQ_A and of radius D. The vicinity of the first device EQ_A may also be defined as a non-circular area, in particular in the presence of physical obstacles present within the environment of the first device EQ_A.

The tolerated distance D may be a maximum tolerated distance D. In the example of a proximity application executed by an interactive tablet (corresponding to the first device EQ_A in FIG. 1, for example) and consisting of sending a presentation of a work of art (in a museum) to the mobile terminals of visitors located near the work of art, this application can be executed by the interactive tablet when the mobile terminals of visitors are determined to be at a distance of less than a maximum tolerated distance D (corresponding to devices EQ_B and EQ_C in FIG. 1, for example). Beyond such a maximum tolerated distance D, it is then considered that the visitors are not looking at the work (for example, device EQ_D will not receive a presentation of the work by the first device EQ_A in FIG. 1). The tolerated distance D may also be a minimum tolerated distance D. For example, for the proximity application executed by a first mobile terminal of a first individual (corresponding to the first device EQ_A in FIG. 1) and consisting of detecting whether another individual is located at a distance of less than one meter from the first individual, in the context of respecting a safe distance during management of a health crisis, the first mobile terminal can store a minimum tolerated distance D corresponding to the safe distance (here one meter). Consequently, for the first mobile terminal, the proximity application may consist of alerting the first individual (and/or the other detected terminals) of the presence of one or more other mobile terminal(s) located closer than the safe distance. Referring to FIG. 1 in the context of such an example, the first individual (possessing terminal EQ_A) will be notified of the proximity of two mobile terminals EQ_B and EQ_C.

The execution of a proximity application then requires, for a given device (here the first device EQ_A), first detecting the possible proximity of other devices EQ_B, EQ_C. The execution of the proximity application may then require, in a second step, estimating a distance from each of the detected devices EQ_B, EQ_C. For this purpose, a method of detection between communicating objects is detailed in FIGS. 3 to 5.

Figure 4:
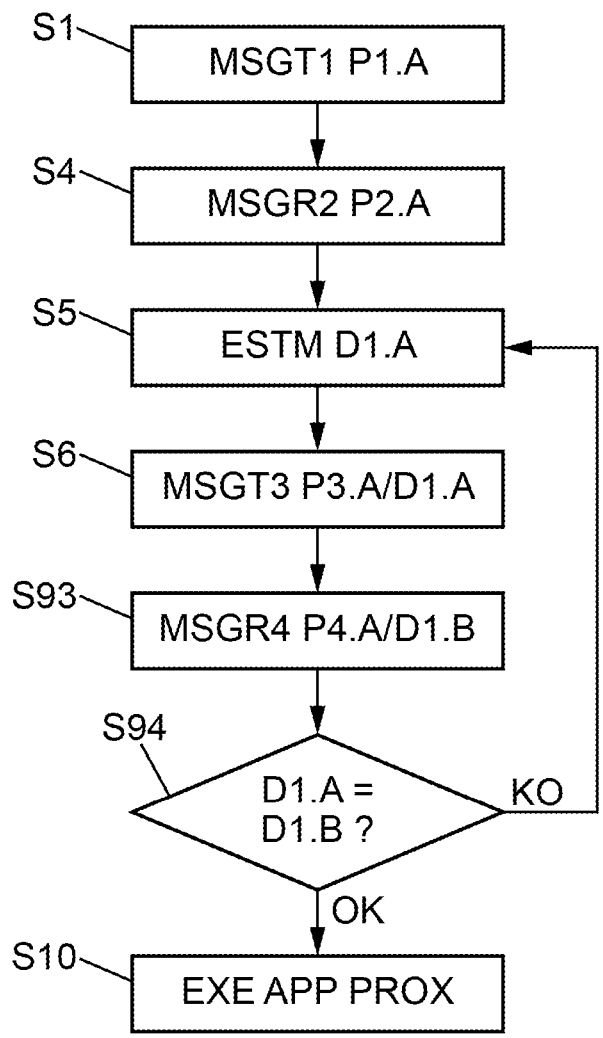
FIG. 4 shows a method for detecting devices that is implemented by a first device according to one embodiment.
Figure 5:
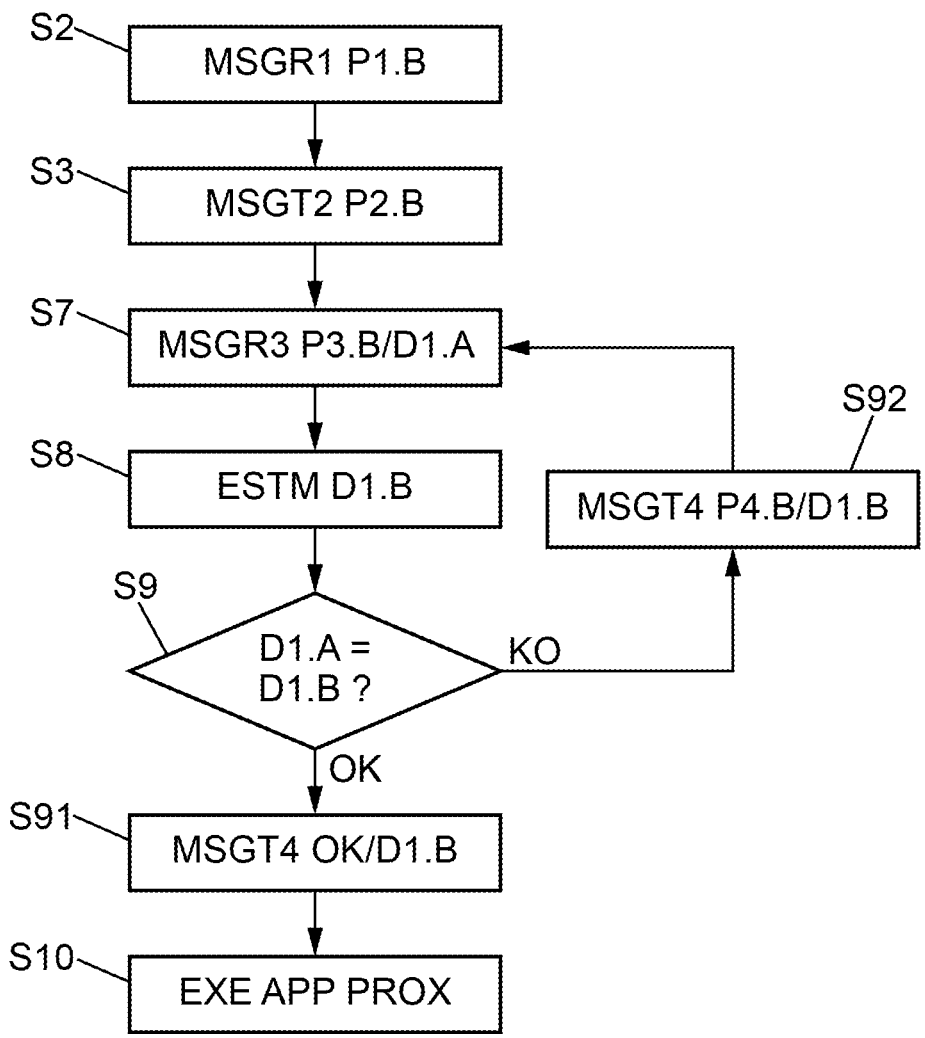
FIG. 5 shows a method for detecting devices that is implemented by a second device according to one embodiment.

Reference is now made to FIGS. 3, 4, and 5. FIG. 3 represents a method of detection between communicating objects, in the context of implementing a proximity application for example. FIGS. 4 and 5 detail such a detection method as implemented respectively by a first device EQ_A initiating the detection method, and by a second device EQ_B detected within the vicinity of the first device EQ_A.

The detection method is described for a proximity interaction between a first device EQ_A and a second device EQ_B. However, the method is applicable for detecting the proximity of several communicating objects. The method is described as being initiated by the first device EQ_A. However, the other devices EQ_B-EQ_D may have a structure equivalent to the structure of the first device EQ_A as represented in FIG. 2, and each device EQ_B-EQ_D may also initiate the method of proximity detection.

The detection method described in FIGS. 3 to 5 comprises a phase of detection, by the first device EQ_A, of the possible presence of one or more other devices EQ_B, EQ_C in the vicinity of the first device EQ_A. Such a vicinity is characterized by a minimum transmission power P and/or a tolerated distance D. With reference to FIG. 3, steps S1, S2, S3, and S4 detail a phase of detecting communicating object EQ_B.

The detection method may also include a phase of confirming the distance between the first device EQ_A and each of the devices EQ_B, EQ_C detected in the vicinity of the first device EQ_A during the detection phase. Referring to FIG. 3, steps S5, S6, S7, S8, S9, S91, S92, and S93 detail a phase of confirming the distance between the first device EQ_A and the second device EQ_B. In particular, such a distance confirmation phase of the detection method may in particular comprise a phase of confirming the presence (or absence) of direct line of sight between the first device EQ_A and each of the detected devices EQ_B, EQ_C. Such confirmation of the presence or absence of direct line of sight thus makes it possible to detect the possible presence of physical obstacles (such as a wall) between the first device EQ_A and one or more other devices EQ_B, EQ_C detected, which can distort the concept of proximity between two devices. Indeed, most proximity applications require proximity with a direct view between the devices: for example, a presentation of a painting hanging on a wall is not supposed to be sent to the mobile terminals of visitors located behind the wall, such visitors potentially being close to the work ("as the crow flies") but located in a room adjacent to the room in which the work is located.

In the context of the method as described, the devices EQ_A-EQ_D are each considered to have a fixed position, or at least to have a substantially constant position relative to each other during the period of time the method of proximity detection is executing.

With reference to FIGS. 3 and 4, in a step S1, the first device EQ_A has a given position that is fixed in space. The first device EQ_A initiates the detection phase by sending a first message in the form of a radiofrequency signal. The first message is transmitted with a first transmission power P1.A. The sending of such a first message at the first transmission power P1.A aims to reach any other communicating devices present within an area of proximity (or vicinity) defined by the range of the first transmission power P1.A. Thus, the first transmission power P1.A is chosen by the first device EQ_A to be greater than the target transmission power P. Such a target transmission power P is specific to the proximity application executed by the first device EQ_A. The target transmission power P is also linked to a tolerated distance D between the first device EQ_A and another device for the execution of the proximity application. The range of the first message is therefore constrained by the first transmission power P1.A. Devices located beyond such a range will thus not receive the first message. Referring to FIG. 1, device EQ_D for example is located outside the range of the first message. The first message is a broadcast constrained only by the first transmission power P1.A, and therefore in principle does not target any given device. The first message may for example be sent in the form of a broadcast message. Such a first message is then potentially received by several different communicating devices EQ_B, EQ_C. Such devices are in principle not identified by the first device EQ_A at this stage. Referring to FIG. 1, such a first message sent in step S1 by the first device EQ_A reaches a range substantially represented by the circle illustrated in FIG. 1. Alternatively, the range of the first message may be non-circular around the first device EQ_A, in particular in the case of physical obstacles or surrounding magnetic fields disrupting the propagation of the first message.

The first message may for example be similar to a handshake message. The first message may comprise data transmitted by the first device EQ_A and comprise an element or a combination of elements among:
  information relating to the proximity application, such as a context of the proximity application or even a proximity perimeter associated with the proximity application (via the value of the target transmission power P or of the tolerated distance D, for example),
  information indicating for example an intention of the first device EQ_A to establish an interaction within the framework of such a proximity application,
  an element identifying the first device EQ_A,
  data relating to the first transmission power P1.A.

The data relating to the first transmission power P1.A may include:
  an explicit value of the first transmission power P1.A itself, or
  a numbering or a reference for the first message transmitted, making it possible to indicate the value of the first transmission power P1.A implicitly, in particular in the case of a standardized communication protocol (or system) between the first device EQ_A and the second device EQ_B. Indeed, in the case of a standardized system, the devices EQ_A-EQ_D send successive messages at successive preconfigured transmission powers known to the other devices EQ_A-EQ_D. Sending a numbering for the first message transmitted then enables the preconfigured device receiving the first message transmitted to identify the message received in the communication protocol and therefore to deduce the value of the first transmission power P1.A.

In a step S2, the first message is received by a second device EQ_B and a third device EQ_C as illustrated in FIG. 3. In the following and to simplify the description, only the detection method between the first and second devices EQ_A, EQ_B will be detailed, as illustrated in FIGS. 3 and 5. However, a detection method between the first and third devices EQ_A, EQ_C can also be implemented in a similar manner, in parallel with the steps described below.

In step S2, the second device EQ_B receives the first message transmitted by the first device EQ_A, via its communication unit COM-B (via a radiofrequency reception antenna for example) at a first reception power P1.B. The first reception power P1.B in principle is lower than the first transmission power P1.A. Indeed, the radiofrequency signal corresponding to the first message may be attenuated during its propagation, in particular due to atmospheric absorption, the presence of magnetic fields in the path of the signal, or even possible multiple reflections of the signal, between its transmission by the first device EQ_A and its reception by the second device EQ_B.

At the end of step S2, the second device EQ_B identifies the intention of the first device EQ_A to initiate a proximity interaction in its vicinity. The second device EQ_B also identifies that the second device EQ_B is within said vicinity.

As illustrated in FIGS. 3 and 5, in a step S3, the second device EQ_B transmits, in response to the first message received, a second message at a second transmission power P2.B. The second message is in principle a point-to-point (unicast) transmission to the first device EQ_A. The second message may for example be similar to an acknowledgment message (or ACK) to inform the first device EQ_A that the first message has been received by the second device EQ_B. The second message may comprise an element or a combination of elements among:
  information specific to the second device EQ_B relating to the execution of the proximity application and/or indicating for example the interaction conditions of the second device EQ_B within the framework of such a proximity application,
  an element identifying the second device EQ_B,
  data relating to the reception conditions of the first message by the second device EQ_B, in particular linked to the characteristics of the radiofrequency reception antenna of the second device EQ_B such as the reception antenna gain for example.

The second transmission power P2.B of the second device EQ_B is chosen by the second device EQ_B so as to ensure that the first device EQ_A is within the range of the second message. Such a second transmission power P2.B may be equal to the first transmission power P1.A as read by the second device EQ_B in the content of the first message. In particular, the second transmission power P2.B may be lower than the first transmission power P1.A, notably if the second device EQ_B determines that the range reached by the first message is greater than the range required to reach the second device EQ_B. In other words, the first message may be received at a first reception power P1.B that is too high compared to a reception power required by the proximity application. For this purpose, the second device EQ_B may determine a ratio between the first transmission power P1.A contained in the first message and the first reception power P1.B measured by the second device EQ_B. The second device EQ_B may then choose to send the second message at a second transmission power P2.B if such a ratio is greater than a predefined factor for example, such a second transmission power P2.B always being chosen to guarantee that the first device EQ_A is within the range of the second message.

In particular, the second message comprises at least one item of data relating to the second transmission power P2.B. Such data relating to the second transmission power P2.B may include:
- an explicit value of the second transmission power P2.B itself, or
- a numbering or a reference for the second transmitted message, making it possible to indicate the value of the second transmission power P2.B implicitly in the case of a standardized communication system between the first and second devices EQ_A, EQ_B.

As illustrated in FIGS. 3 and 4, in a step S4, the first device EQ_A receives the second message transmitted by the second device EQ_B. The second message is received by the first device EQ_A at a second reception power P2.A. At this stage, the detection phase of the detection method is complete: the first device EQ_A has detected the presence of another device (namely the second device EQ_B) within the vicinity of interaction with the first device EQ_A in the context of the proximity application. The first device EQ_A is therefore assured that the second device EQ_B is within the range of the target transmission power P. The first device EQ_A can then proceed to the phase of confirming a distance with the second device EQ_B so as to refine the detection method.

As illustrated in FIGS. 3 and 4, in a step S5, the second message is interpreted by the processing unit UT_A of the first device EQ_A. On the one hand, the first device EQ_A knows the transmission power of the second message (corresponding to the second transmission power P2.B) sent by the second device EQ_B, due to the data relating to the second transmission power P2.B received in the content of the second message. On the other hand, the first device EQ_A is capable of measuring the second reception power P2.A of the second message. From these two values P2.A and P2.B, the processing unit UT_A of the first device EQ_A proceeds, in step S5, with a first estimate D1.A of the distance between the first device EQ_A and the second device EQ_B. Such a first estimate D1.A may for example be obtained by applying the Friis equation (or transmission equation) linking, for a signal (here the second message), the transmission power from a transmitting object (here the second transmission power P2.B of the second device EQ_B), the reception power (here the second reception power P2.A of the first device EQ_A), and the distance between the transmitting and receiving objects (here the first distance estimate D1.A) by:

$$\frac{P_{rec}}{P_{trans}} = G_{trans} G_{rec} \left(\frac{\lambda}{4\pi d}\right)^2 \quad \text{[Math. 1]}$$

where:
$P_{rec}$ corresponds to the reception power of the receiving object,
$P_{trans}$ corresponds to the transmission power of the transmitting object,
$G_{trans}$ corresponds to the gain of the transmitting antenna, here that of the second device EQ_B,
$G_{rec}$ corresponds to the gain of the receiving antenna, here that of the first device EQ_A,
$\lambda$ corresponds to the frequency of the radiofrequency signal, here that of the second message, and
d corresponds to the distance between the transmitting and receiving objects, here the first distance estimate between the first device EQ_A and the second device EQ_B.

Such an equation [Math.1] may also be adapted to take into account uncertainty factors related for example to:
antenna losses, related to the sensitivities of the receiving and transmitting antennas of the first and second devices EQ_A, EQ_B respectively, and/or
the aiming of the receiving and transmitting antennas,
the polarization and/or non-alignment of the receiving and transmitting antennas,
atmospheric losses related to humidity, dispersion, and/or refraction etc. in the environment in which the second message is propagated.

In particular, such a first distance estimate D1.A is based, at this stage, on an assumption that the propagation of the second message is carried out according to direct line of sight ("LoS"). The ratio between the second reception power P2.A and the second transmission power P2.B is considered by the first device EQ_A as inversely proportional to the square of the first distance estimate D1.A. Thus, the difference between the second reception power P2.A and the second transmission power P2.B is directly correlated with the distance separating the first device EQ_A and second device EQ_B. For example, in step S5, the lower the ratio between the second reception power P2.A and the second transmission power P2.B, the greater the first distance estimate D1.A by the first device EQ_A will be.

At the end of step S5, the first device EQ_A has determined a first distance estimate D1.A from the second device EQ_B on the basis of the second message received in step S4 and according to the assumption of line of sight between the first and second devices EQ_A, EQ_B. In particular, the first device EQ_A verifies that the first distance estimate D1.A is well below the tolerated distance D. Otherwise, the step S1 of transmitting the first message is repeated by the first device EQ_A.

As illustrated by FIGS. 3 and 4, in a step S6, the first device EQ_A sends a third message to the second device EQ_B. Such a third message aims in particular to confirm the first distance estimate D1.A of the first device EQ_A, at the second device EQ_B. For this purpose, the third message is transmitted by the first device EQ_A with a third transmission power P3.A determined in correlation with the first distance estimate D1.A. The determination of such a third transmission power P3.a in particular takes into account the physical and capacitive characteristics of the radiofrequency transmission of the third message such as the propagation frequency of the third message, the transmission properties of the transmitting antenna of the first device EQ_A, or the reception properties of the receiving antenna of the second device EQ_B for example. The determination of such a third transmission power P3.a also takes into account criteria of the proximity application in relation to the first distance estimate D1.A, for example, depending on whether or not the proximity application requires that the distance between the first and second devices EQ_A, EQ_B be substantially equal to the tolerated distance D, or be between the tolerated distance D and the first distance estimate D1.A, for example. The third transmission power P3.A may in particular be determined by the processing unit UT_A of the first device EQ_A by applying a decision matrix taking into account such criteria and characteristics, considering the first distance estimate D1.A. Thus, in step S6, the first device EQ_A transmits the third message with a third transmission power P3.A on the assumption that the second device EQ_B is located at a distance equal to the first distance estimate D1.A. In a manner analogous to the preceding messages, the third message comprises data relating to the third transmission power P3.A of the first device EQ_A. The third message may also comprise the first distance estimate D1.A by the first device EQ_A.

The transmission of such a third message also initiates the phase of confirmation or non-confirmation of the presence of line of sight between the first device EQ_A and the second device EQ_B. Indeed, the assumption of line of sight is tested by the first device EQ_A with the sending of the third transmission power P3.A. As the distance d between the first device EQ_A and the second device EQ_B is considered by the first device EQ_A as being equal to the first distance estimate D1.A, the first device EQ_A is able to predict a theoretical reception power for the third message by the second device EQ_B with the assumption of line of sight between the first and the second device EQ_A, EQ_B. The first device EQ_A may in particular define a threshold ratio Rs corresponding to a ratio between the third transmission power P3.A and the predicted theoretical reception power.

As illustrated by FIGS. 3 and 5, in a step S7, the second device EQ_B receives the third message transmitted by the first device EQ_A, at a third reception power P3.B. In particular, the second device EQ_A receives, via the third message, the value of the transmission power of the third message (namely the exact value of the third transmission power P3.A). The second device EQ_B may also receive the first distance estimate D1.A made by the first device EQ_A.

As illustrated by FIGS. 3 and 5, in a step S8, the second device EQ_B may also in turn proceed with a determination of a second distance estimate D1.B between the first and second devices EQ_A, EQ_B. For this purpose, the processing unit UT_B of the second device EQ_B may for example apply formula [Math.1] but replacing $P_{trans}$ with the third transmission power P3.A and $P_{rec}$ with the third reception power P3.B.

As illustrated by FIGS. 3 and 5, in a step S9, the second device EQ_B can then compare the second distance estimate D1.B made by the second device EQ_B in step S8 with the first distance estimate D1.A made by the first device EQ_A in step S5.

In a first case, if the second distance estimate D1.B made by the second device EQ_B is substantially equal to the first distance estimate D1.A made by the first device EQ_A (at a given predefined threshold value ε), the assumption of line of sight made by the first device EQ_A in step S3 is in principle correct and confirmed by the calculations of the second device EQ_B. The phase of confirming line of sight between the first device EQ_A and the second device EQ_B is then completed. In this first case, in a step S91, the second device EQ_B transmits a fourth message intended for the first device EQ_A. Such a fourth message then aims to confirm (or validate) the first distance estimate D1.A made by the first device EQ_A. The fourth message may then include the second distance estimate D1.B made by the second device EQ_B. Alternatively, the fourth message may comprise a difference (such a difference therefore being less than the threshold value ε) between the first and second distance estimates D1.A, D1.B and/or a Boolean value indicating confirmation that the first and second devices EQ_A, EQ_B have determined a substantially common distance estimate (to within the threshold value ε).

Conversely, in a second case, if at the end of step S9 the second distance estimate D1.B made by the second device EQ_B differs from the first distance estimate D1.A (for example the two distance estimates D1.A, D1.B having a difference greater than the predefined threshold value ε), the assumption of direct visibility made by the first device EQ_A in step S5 is in principle invalidated by the calculations of the second device EQ_B. The phase of confirming the lack of line of sight between the first device EQ_A and the second device EQ_B is then completed. In this second case, in step S92, the fourth message transmitted by the second device EQ_B to the first device EQ_A is then intended to invalidate the first distance estimate D1.A made by the first device EQ_A. The fourth message may include the second distance estimate D1.B made by the second device EQ_B.

The phase of confirming a line of sight (or lack of line of sight) between the first and second devices EQ_A, EQ_B may also be completed without the second device EQ_B performing a second distance estimate D1.B. Such a step (not represented in FIGS. 3 and 5) may consist of the second device EQ_B determining, at the end of the step S7 of receiving the third message, the theoretical reception power at which the second device EQ_B is supposed to receive the third message, under the assumption made by the first device EQ_A. In other words, having received the first distance estimate D1.A and the third transmission power P3.A, the processing unit UT_B of the second device EQ_B determines the theoretical reception power of the third message. To this end, the processing unit UT_B of the second device EQ_B can apply the above formula [Math.1] but replacing $P_{trans}$ with P3.A, d with D1.A, and $P_{rec}$ being the theoretical reception power to be determined. On the other hand, the second device EQ_B may compare such a theoretical reception power with the third reception power P3.B actually measured by the second device EQ_B when receiving the third message. If the theoretical reception power is substantially equal to the third reception power P3.B (within a predefined threshold value for example), this means that the assumption made by the first device EQ_A is confirmed in principle by the second device EQ_B. The comparison of such reception powers (theoretical and actually measured) makes it possible to confirm or invalidate the assumption of line of sight between the first and second devices EQ_A, EQ_B. Indeed, according to such an assumption, the transmission of a signal at a given transmission power (here P3.A) to an object at a known distance (here considered to be D1.A) would allow predicting the reception power (here the theoretical reception power) of the signal at this object. Such a step may be implemented by the second device EQ_A in addition to steps S8 and S9. Alternatively, the second device EQ_B may, on the one hand, determine the threshold ratio Rs in the manner of the first device EQ_A as a ratio between the third transmission power P3.A and the determined theoretical reception power. In another embodiment, the second device receives such a threshold ratio Rs in the third message. The second device EQ_B may, on the other hand, calculate a second ratio between the third transmission power P3.A and the third reception power P3.B. The second device EQ_B can then compare the threshold ratio Rs with the second ratio. If the second ratio is greater than the threshold ratio Rs, this means that the third message is received at a power (namely P3.B) that is lower than the predicted reception power (namely, the theoretical reception power); this is due in particular to the possible presence of a physical obstacle having reduced the power of the third message by reflection of the waves on the obstacle: the second device EQ_B determines in particular that the assumption of line of sight between the first device and the second device EQ_A, EQ_B is incorrect. Conversely, the assumption of line of sight is maintained if the second ratio is substantially equal to or greater than the threshold ratio Rs.

In the first case as in the second case, in the disjoint steps S91 and S92, the second device EQ_B transmits the fourth message at a fourth transmission power P4.B, such a fourth transmission power P4.B being determined in correlation with the second distance estimate D1.B made by the second device EQ_B in step S8. In the manner of the third transmission power P3.A determined by the first device EQ_A, the determination of the fourth transmission power P4.B may take into account characteristics related to the radiofrequency signal carrying the fourth message and/or criteria relating to the proximity application. The fourth message may also, in the manner of the preceding messages, include data relating to the conditions of reception of the third message by the second device EQ_B. The fourth message may also, in the manner of the preceding messages, include data relating to the fourth transmission power P4.B of the fourth message.

Such a fourth message is then received by the first device EQ_A in a step S93 as illustrated in FIGS. 3 and 4, at a fourth reception power P4.A. The first device EQ_A also receives data confirming, or conversely invalidating, the first distance estimate D1.A made by the first device EQ_A.

Thus, at the end of step S93, the first device EQ_A and the second device EQ_B have carried out an exchange resulting in the confirmation, or conversely the invalidation, of a substantially common estimate of a distance between the first device EQ_A and the second device EQ_B.

The first device EQ_A can then, in a step S94 illustrated in FIG. 4, identify a distance confirmation or conversely a distance invalidation, made by the second device EQ_B. The phase of confirmation or non-confirmation of a line of sight between the first and second devices EQ_A, EQ_B is then ended. In the case of confirmation of such a distance, the distance confirmation phase is also ended at the end of step S94 and the phase of executing the proximity application between the first device EQ_A and second device EQ_B can be implemented, in a step S10.

In the case where the first distance estimate D1.A made by the first device EQ_A is invalidated, in step S94, a new distance estimate is implemented at the first device EQ_A. This means for example that the assumption of line of sight made by the first device EQ_A for estimating the first distance estimate D1.A is invalid (the first device EQ_B has for example overestimated the distance separating the first and second devices EQ_A, EQ_B due to the presence of multiple reflections during propagation of the second message). In an embodiment not represented by FIGS. 3 to 5, the detection method can end when the assumption of line of sight between the first and second devices EQ_A, EQ_B is invalidated at the first device EQ_A by the second device EQ_B, at the end of step S93. This is the case, for example, if the criteria of the proximity application require such a line of sight between the devices (as in the example of a painting hanging on a wall in a museum and a user is located on the other side of such a wall). In the rest of the detection method described, a phase of estimating the actual distance (with or without line of sight) between the first and second devices EQ_A, EQ_B is implemented at the end of the phase of confirmation or non-confirmation of a line of sight. Such a distance confirmation phase can remain relevant, especially since a divergence in the distance estimate between the first and second devices EQ_A, EQ_B may be caused by factors other than an invalid assumption of line of sight.

Steps S5, S6, S7, S9, S9, S91, S92, and S93 are then repeated with the values for the received transmission power and the measured reception power of the last message exchanged, such that the first device EQ_A and the second device EQ_B respectively carry out one or more new steps of evaluation and confirmation (or invalidation) of a distance estimate. Steps S5, S6, S7, S9, S9, S91, S92, and S93 can be repeated up to an $n^{th}$ iteration (n being an integer greater than 1) when an $n^{th}$ estimation dn.A (or dn.B) of the distance estimate is confirmed as being substantially common to both the first and second devices EQ_A, EQ_B. Step S10 of executing the proximity application can then be implemented.

The invention claimed is:

1. A method, implemented by a first device, for establishing a radiofrequency communication with at least a second device, the method comprising:
   a) transmitting a first message at a first transmission power, the first transmission power being greater than a minimum target transmission power;
   b) receiving at least one second message coming from at least the second device, the second message being received at a second reception power and comprising data relating to a second transmission power of the second device distinct from the second reception power; and
   c) transmitting a third message at a third transmission power towards the second device, the third transmission power being determined on the basis of the second reception power and the second transmission power by correlating the second reception power and the second transmission power according to a propagation hypothesis, the third message being transmitted to assess the propagation hypothesis.

2. The method according to claim 1, further comprising:
   a first estimate of the distance between the first device and the second device, made on the basis of the second reception power of the second message and the second transmission power,
   and wherein the third transmission power is further determined on the basis of the first distance estimate.

3. The method according to claim 2, wherein the third message comprises at least the first distance estimate.

4. The method according to claim 1, wherein the third message comprises at least one data item relating to the third transmission power.

5. The method according to claim 1, the radiofrequency communication being established for the purpose of a proximity application, the proximity application being characterized by at least one proximity criterion between the first device and the second device,
   and wherein the third message is transmitted at least on the basis of the first proximity criterion, the second reception power of the second message, and the second transmission power.

6. The method according to claim 5, the proximity criterion corresponding to a tolerated distance between the first device and the second device, and wherein the third message is transmitted on the basis of a comparison between a first distance estimate between the first device and the second device made of the basis of a second reception power of the second message and the second transmission power, and the tolerated distance.

7. The method according to claim 1 and further comprising:
d) receiving a fourth message coming from the second device, the fourth message being received at a fourth reception power, the fourth message comprising at least one data item relating to a second distance estimate between the first device and the second device.

8. The method according to claim 7, wherein the data relating to the second distance estimate comprises an element or a combination of elements among:
a value of the second distance estimate;
a difference between the first distance estimate and the second distance estimate; and
an indication relating to the validity of the first distance estimate.

9. The method according to claim 7, wherein the fourth message further comprises data relating to a fourth transmission power of the second device.

10. The method according to claim 9, wherein c) and d) are repeated by replacing the second reception power with the fourth reception power and the second transmission power with the fourth transmission power, if the difference between a first distance estimate between the first device and the second device made of the basis of a second reception power of the second message and the second transmission power, and the second distance estimate is greater than a predefined threshold.

11. The method according to claim 1, wherein the second transmission power of the second device is lower than the first transmission power of the first device.

12. The method according to claim 1, wherein the first message further comprises an element or a combination of elements among:
an identifier of the first device,
data relating to an implementation of a proximity application by the first device.

13. The method according to claim 1, wherein the second message further comprises an element or a combination of elements among:
data relating to the conditions of reception of the first message by the second device,
an identifier of the second device,
data relating to an implementation of a proximity application by the second device.

14. A first device comprising at least:
a memory unit; and
a processing unit comprising at least one processor;
the first device being suitable for implementing the method according to claim 1.

15. A non-transitory readable computer medium storing instructions of a computer program, the computer program causing the implementation of the method according to claim 1 when the computer program is executed by a processor.

* * * * *